United States Patent [19]

Sommeria

[11] 3,786,333

[45] Jan. 15, 1974

[54] DIGITAL REGULATING CONTROL FOR SERVO SYSTEM

[75] Inventor: Marcel R. Sommeria, Bridgeview, Ill.

[73] Assignee: Hyper-Loop Inc., Bridgeview, Ill.

[22] Filed: June 27, 1972

[21] Appl. No.: 266,579

[52] U.S. Cl. ............................... 318/604, 318/606
[51] Int. Cl. ............................................. G05b 1/01
[58] Field of Search ............................ 318/604, 606

[56] References Cited
UNITED STATES PATENTS

| 3,562,619 | 2/1971 | Hyoguchi | 318/604 X |
| 3,546,559 | 5/1968 | Kosem | 318/604 X |
| 3,175,138 | 3/1965 | Kilroy et al. | 318/604 X |
| 3,248,622 | 4/1966 | Kelling | 318/604 X |

*Primary Examiner*—B. Dobeck
*Attorney*—Albert H. Pendleton et al.

[57] ABSTRACT

In a servo system, a digital regulating control unit has a pair of counters respectively responsive to a source of clock signals and to a source of incremental position command signals, with a comparator for producing a signal having a frequency proportional to the difference in the counting rates of the two counters, and a phase detector for comparing the phase of the signal generated by the comparator with the phase of a signal generated in response to movement of the controlled member of a servo system.

10 Claims, 3 Drawing Figures

DIGITAL REGULATING CONTROL FOR SERVO SYSTEM

BACKGROUND OF THE INVENTION

This invention relates to a digital regulating unit for a servo system and more particularly to apparatus for deriving a variable voltage level error signal in response to two signals, one of which is representative of the position of a physical member controlled by the servo system, and another being representative of the desired or programmed movement of the controlled member.

In the past, stepping systems have incorporated a plurality of counters for counting clock pulses with command pulses received from an NC control apparatus or the like, causing the apparatus to add or skip clock pulses, in accordance with input command pulses. These systems result in a discontinuous series of step motions with each command pulse being fully obeyed before the next one is received. Accordingly, they suffer severe performance limitations in terms of resolution and speed.

In other systems, the input control pulses are converted into an analog signal proportional to the following error between the programmed position and the actual position; and the speed of movement of the controlled member of the servo system is dependant upon the magnitude of the following error. As long as the following error is small, a signal is produced which modified the velocity and direction of movement of the servo system so as to tend to reduce the error signal. However, small magnitudes of error signal occur only during relatively low operating speeds of the servo system. When greater speeds are employed, the difference sometimes exceeds the capacity of the system to handle, and synchronization between the command information and the servo mechanism is lost. It has therefore been necessary, in order to avoid the need for excessive counter capacity, to limit operating speeds to values which do not produce error signals in excess of the capacity of the system.

If an attempt is made to maintain the error signal at a low level by using a relatively low frequency source of clock pulses, the resolution of the system suffers. It is, therefore, desirable to provide an economical way of maintaining synchronization between the command information of the feedback information from the servo mechanism, while allowing the error signal to assume relatively high values, without sacrificing resolution or precision.

Accordingly, it is a principal object of the present invention to provide such a system.

A further object of the present invention is to provide a mechanism for manifesting a variable voltage error signal having a magnitude proportional to the cumulative difference between two input pulse trains.

Another object of the present invention is to provide apparatus in which the error signal is derived by digital means which maintains synchronization between the servo system and the command information, even when the error signal is allowed to assume a wide range of values.

A further object of the present invention is to provide means for initially synchronizing the servo system and command information, for any position of the controlled member of the servo system.

Another object of the present invention is to provide means for deriving a variable voltage error signal in response to the difference in phase between two signals at the same frequency, one signal being derived in response to command signals and the other being derived in response to a feedback signal from the servo system.

Other objects and advantages of the present invention will become apparent upon inspection of the following description and the accompanying drawings.

SUMMARY OF THE INVENTION

In one embodiment of the present invention there is provided a first counter for counting the pulses of a clock frequency source, a second counter for counting a series of command pulses, a comparator unit interconnected between said first and second counters for manifesting an output pulse during the time the contents of said first and second counter are equal, a third counter connected to the output of the comparator unit, a resolver connected with a member driven by a servo system, apparatus for deriving from the first counter a two-phase signal for exciting the resolver, such signal having a frequency equal to that of the carry pulses from the first counter, apparatus responsive to the resolver for producing a feedback pulse train, a fourth counter having a radix equal to that of the third counter connected to receive the feedback pulse train, and a phase detector connected to the third and fourth counters for producing a train of variable length pulses each having a pulse length proportional to the phase difference between outputs from said third and fourth counters, and an integrator for converting the variable length pulse train into a variable voltage level, whereby the driving member of the servo system is controlled in accordance with the command pulses.

BRIEF DESCRIPTION OF THE DRAWINGS

Reference will now be made to the accompanying drawings in which.

DESCRIPTION

Figure 1:
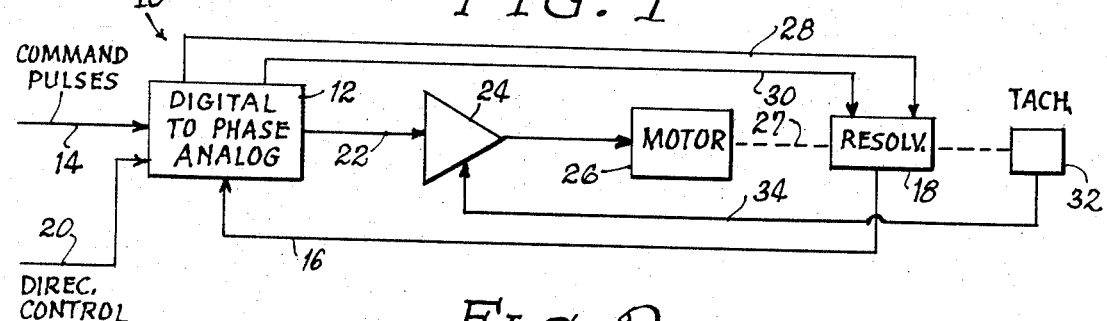
FIG. 1 is a functional block diagram of a servo system incorporating the present invention.

In FIG. 1 a digital-to-phase-to-analog converter 12 is incorporated as a part of a servo system 10. A series of command pulses is presented to the converter 12 over an input line 14, and a feedback signal is presented to the converter 12 over a second input line 16, originating with a resolver 18. A directional control signal is also presented to the converter 12 over a line 20, indicating the sign of movement commanded by the command pulses on the line 14. The function of the converter 12 is to produce an error signal on the line 22, which is connected to a servo amplifier 24. The servo amplifier 24 amplifies the error signal and it to the motor 26 so that controlled member (indicated by the dashed line 27) driven by the motor 26 is moved in the manner indicated by the command pulses arriving over the line 14. As the controlled member is moved, the resolver 18 transmits a signal to the converter 12 over the line 16 which is representative of the movement of the controlled member. The sign of the signal on the line 22 is such that the motor 26 moves in a forward or reverse direction effectively to reduce the magnitude of the error signal.

The resolver 18 is excited by a two phase a.c. signal derived from the converter 12 and applied thereto over the lines 28 and 30. A tachometer 32 is connected with the shaft of the motor 26 and furnishes a signal over a line 34 to the amplifier 24, so that a signal derived from the velocity of the controlled member serves to prevent the controlled member from over-shooting its prescribed position. Except for the unit 12, the components of the system illustrated in FIG. 1 are well known to those with ordinary skill in the art and so their specific construction and operation need not be described in any further detail.

Figure 2:
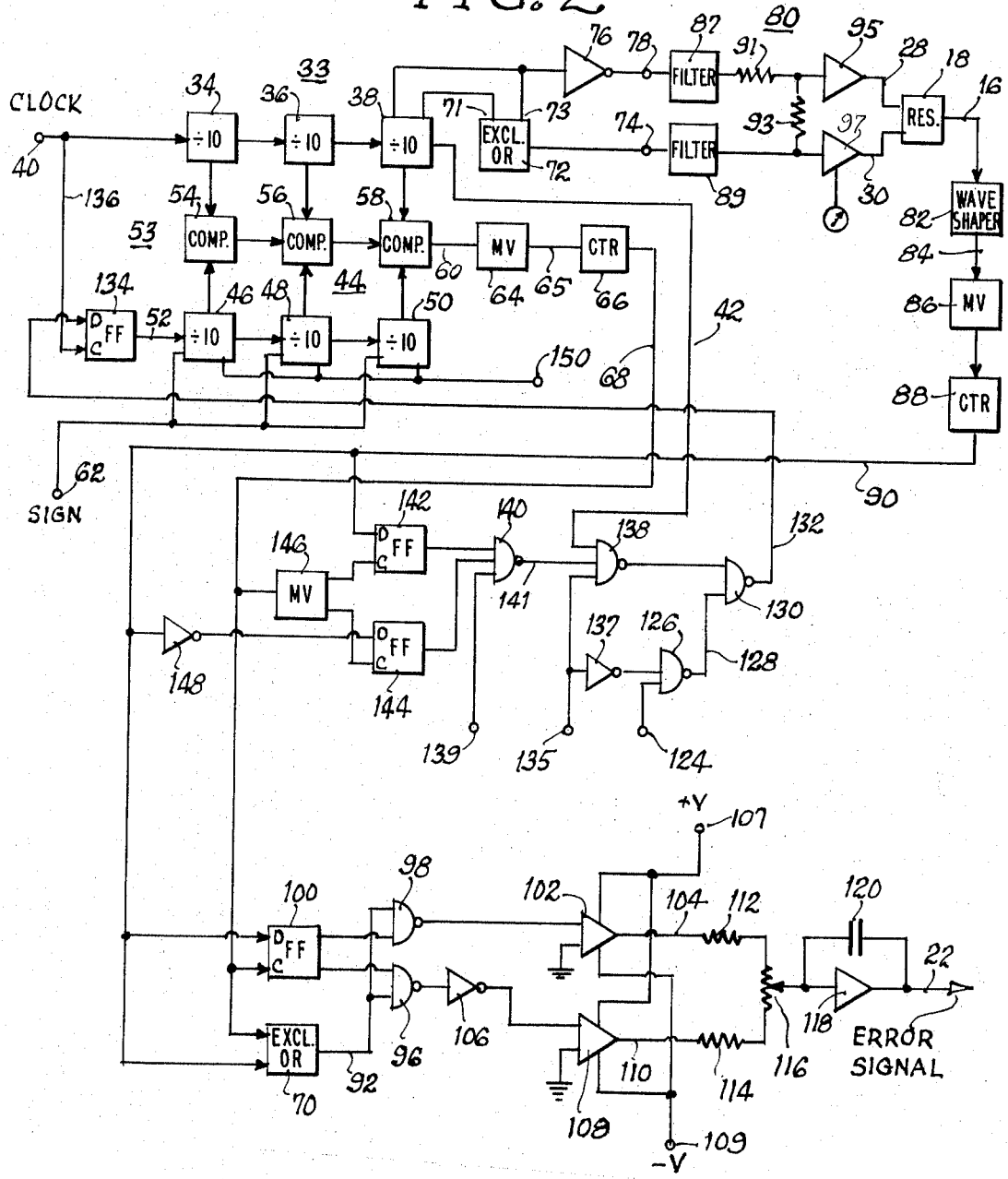
FIG. 2 is a functional block diagram, partly in schematic diagram form, of the digital-to-phase-to analog converter incorporating the present invention.

Referring now to FIG. 2 a functional block diagram of the converter 12 is illustrated. A first counter 33, employing three cascade connected binary-coded-decimal decade units 34, 36 and 38, is connected to an input terminal 40 to which a source of clock pulses (not shown) is applied. The clock pulse frequency is relatively high, in order to maximize the resolution of the system, and in one preferred embodiment is 3,000 KHz. The overflow output from the decade unit 38 is supplied to a line 32. The frequency of pulses on the line 42 is 3 KHz., viz. the clock frequency divided by the radix ($10^3$) of the first counter 33.

A second counter 44, incorporating 3 cascade connected binary-coded-decimal decade units 46, 48 and 50, counts command pulses applied to an input line 52. The manner in which the pulses come to be applied to the line 52 will be described in more detail hereinafter.

Each corresponding decade units of the counters 33 and 44 are connected to the inputs of 3 comparator units 54, 56 and 58. The comparator units are connected in cascade so as to produce, on an output line 60, a distinct signal whenever the content of the counter 33 is identical to that of the counter 44. It is evident that, while no pulses are being applied to the counter 44, the frequency present on the output line 60 is 3 KHz., the same frequency as the overflow output 42.

Each of the units 46, 48 and 50 of the counter 44 is connected to a terminal 62 which is energized in accordance with the sign of the command pulses supplied to the counter 44. If the sign is positive, one voltage level is present on the terminal 62, and the counter 44 is counted in a forward direction; a negative sign is indicated by a different voltage level at the terminal 62 and causes the counter 44 to count the pulses on the input line 52 in the reverse direction, or downwardly. When pulses are supplied to the counter 44 over the line 52, the frequency of the signal present on the output line 60 of the comparator unit 53 is either less than or greater than 3 KHz., in accordance with whether the sign of the command pulse is positive or negative. Application of pulses to the line 52 which advance the state of the counter 44 delays coincidence with the counter 33, and correspondingly delays each pulse on the line 60, lowering the output frequency. Conversely, when the counter 44 counts downwardly, the coincidence of counters 33 and 44 occurs sooner, and the frequency of the pulses on the line 60 increases.

Figure 3:
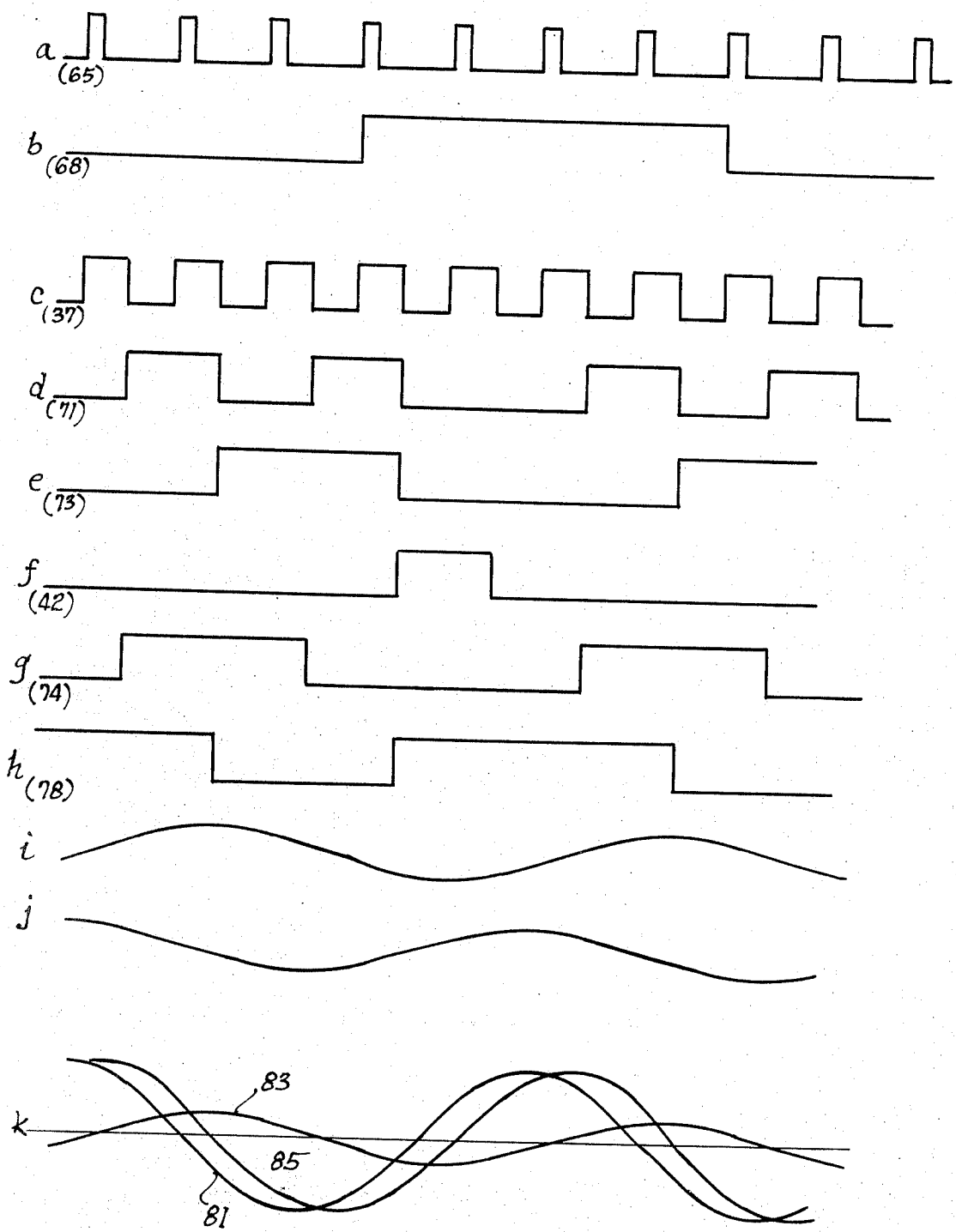
FIG. 3 is an illustration of various waveforms which occur during operation of the apparatus of FIG. 2.

The frequency of the signal on the line 60 is directly related to the rate at which command pulses are applied to the counter 44, including the effect of the sign of the command pulses. The output line 60 is connected to a one shot multivibrator 64, which shapes the pulses on the line 60, and eliminates any noise which may accompany the pulses. The output of the multivibrator 64 is connected via line 65 to the input of a counter 66. The counter 66 preferably has a radix of 8, so that a square wave signal is produced on an output line 68 at a frequency equal to one-eighth the frequency of the pulses supplied to it from the one shot multivibrator 64. The counter 66 is a binary counter formed of three flip-flops connected in cascade in the ordinary way, so that the third flip-flop manifests a binary-4 bit. The output 68 of this flip-flop is low while the counter 66 represents binary-0 through binary-3, and is high when the counter 66 represents binary-4 through binary-7. Thus, a square wave is manifested at the output 68 which is low for four successive pulses applied to the counter 66, then high for the next four successive pulses, etc., as shown in FIGS. 3a and 3b. A counter with a larger radix may be substituted for the counter 66 if desired, in which case synchronization is maintained over a greater range of values of following error. However, a radix of 8 has been found suitable for practical conditions of operation. As will be appreciated from the nature of the operation of the apparatus as described below, no loss in accuracy results from expanding the radix of the counter 66, the system being operable to bring the following error precisely to zero for any radix.

Two outputs 71 and 73 from the binary-coded-decimal decade unit 38 of the counter 33 are applied to an exclusive-OR gate 73, and the output from the exclusive-OR gate 72 is connected to an output terminal 74. The outputs 71 and 73 are derived from the second and third flip-flops within the unit 38, which represent the binary-2 bit and the binary-4 bit, respectively. The unit 38, as well as the other decade units of the counters 33 and 44, comprises four flip-flops connected as a binary counter, together with a gating arrangement to reset the flip-flops to their starting condition when 10 pulses have been counted. As these units are well known in the art, they will not be described in any further detail.

The FIGS. 3c, in FIGS.3c, 3d, and 3e represent the outputs of the first three flip-flops, respectively representing binary-1, 2 and 4. The exclusive-OR gate 72 accordingly produces an output (FIG. 3c) when the content of the stage 38 comprises binary-2, 3, 4, or 5, and no output at a time when the stage 38 manifests any other binary number. The signal presented on the terminal 74 is therefore one which has the same frequency as that of the output on the line 42, shown in FIG. 3f, but is slightly assymetrical, as shown in FIG. 3g, being a low voltage level for six successive counts, and a high voltage level for four successive counts during each cycle.

The output 71 from the binary-2 order is also connected through an inverter 76 to another output 78. FIG. 3h illustrates the waveform at terminal 78. Accordingly, the terminal 78 presents a signal having the same frequency as the output on the line 42, but the output is present only when the stage 38 manifests a binary 0, 1, 2, 3, 8 or 9. The signals present at the terminals 74 and 78 form two waveforms which approximate a two-phase signal at the frequency of the signal present on the line 42. These signals are modified somewhat by a network 80, and are employed to form a two-phase a.c. signal applied to the resolver 18 over the lines 28 and 30.

The network 80 includes filters 87 and 89 to filter the pulse train present at the terminals 74 and 78, respectively, so that only their fundamental frequencies remain, so that the a.c. waveforms shown in FIGS. 3i and 3j are produced from the pulse trains on the terminals 74 and 78, respectively. These waveforms are out of phase with each other by an amount greater than the 90° required for a two-phase voltage. Therefore, the waveform derived from terminal 78 (FIG. 3h) and a lesser signal derived from the terminal 74 (FIG. 3i), are mixed to shift the phase of the signal derived from the terminal 78. This is accomplished by the resistors 91 and 93 which connect the outputs of the filters 89 and 91 to the input of the amplifier 95. The two signals which are thus mixed, together with their result, is shown in FIG. 3k.

The scale of FIG. 3k is enlarged somewhat to better illustrate the effect of the mixing. The curve 81 represents an enlarged version of the waveform shown in FIG. 3j, and the waveform 83 represents a lesser amplitude signal of the waveform shown in FIG. 3i. The waveform 85 is the result, which represents a shifting of the waveform 81 to a position in which it is exactly 90° out of phase with the waveform of FIG. 3i, and slightly less amplitude. The signals represented by the waveform 85 of FIG. 3k and the waveform of FIG. 3i are both amplified in amplifiers 95 and 97; the gain of amplifier 97 is controlled so that the amplitudes of the signals applied to the resolver 18 over the lines 28 and 30 are equal. And as they are derived from the last stage 38 of the counter 33 the signals on the lines 28 and 30 have a prescribed frequency and phase relation to the clock frequency source applied to the terminal 40.

The resolver 18 modifies the phase of the exciting signals applied over the lines 28 and 30, to produce an output signal on the line 16, which signal changes its phase in proportion to movement of the controlled member. The line 16 is connected to a wave-shaping device 82 which functions in the manner of a trigger to produce a square wave output of the line 84 having a frequency equal to the frequency on the line 16. The line 84 is connected to the input of a one-shot multivibrator 86, which acts effectively as a noise filter, and an output of the one-shot multivibrator 86 is connected to the input of a counter 88. The counter 88 has the same construction and radix as the counter 66, and a square wave is accordingly produced at an output 90 which is connected from the third flip-flop of the counter. The square wave has a frequency equal to one-eighth of that applied to the input of the counter 88. The frequency of the signal applied to the counter 88 is equal to the 3 KHz. frequency present at the terminals 74 and 78, modified by the direction and velocity of the motor 26. Accordingly, the frequency of the signal applied to the line 90 is equal to 3 KHz., plus or minus a quantity depending upon the direction and speed of motor rotation. When the motor is not energized, the input to the counter 88 is exactly 3 KHz., and the output on the line 90 is one-eighth of that. The line 90 is connected to one input of the exclusive-OR gate 90, the other input of which is connected to the line 68. An output from the gate 70 is produced on line 92 when one, and only one, of the inputs to the gate 70 is high. If the square wave signals applied to the inputs of the gate 70 are exactly 180° out of phase, the output line 92 is maintained high constantly. If the two input signals are in phase, the output line 92 maintains a constant low potential. For conditions where the two input signals are out of phase, the line 92 produces a pulse train in which the line 92 assumes a low potential during periods in which positive-going portion of one input overlaps the negative-going portion of the other input and a higher potential at other times. The output of the gate 70 is applied to one input each of gates 96 and 98 over a line 92.

Another output of each of the NAND gates 96 and 98 is derived from the mutually exclusive outputs of a flip-flop 100, which is set in one or the other by the step in accordance with the sign of the error signal.

The line 68 is connected to the clock input of the flip-flop 100, while the line 90 is connected to its other input. If the line 90 is high during a negative excursion of the signal on the line 68, the flip-flop 100 assumes one state, and the opposite state is assumed when the potential on the line 90 is low during a negative excursion of the signal on the line 68. The flip-flop 100 is accordingly set in accordance with whether the signal on the line 68 is leading or lagging the signal on the line 90. Only one of the gates 96 and 98 is thereby enabled to pass the train of pulses produced by the gate 70, while the output of the other remains high.

The output of the gate 98 is amplified by an operational amplifier 102, which produces, at an output 104, an alternately positive and negative signal in accordance with the pulse train passed by the gate 98, or, if the output of the gate 98 remains high, the amplifier 102 produces a constant potential of relatively high value.

The gate 96 is connected through an inverter 106 to the input of an operational amplifier 108. The operational amplifier 108 accordingly produces a pulse train corresponding to the pulses which pass the gate 96, but in inverted form. When the output of the gate 96 remains high, the output of the amplifier 108 is maintained at a relatively low value. Both of the operational amplifiers 102 and 108 are driven to saturation by their inputs, and are connected to a balanced voltage source via terminals 107 and 109 having equal positive and negative voltage levels with respect to ground. As a result, the amplifiers 102 and 108 produce, as a high level output, a constant positive voltage nearly equal to the source voltage, and as a low level output, a constant negative voltage of the same amplitude.

The outputs 104 and 110 of the operational amplifiers 102 and 108 are connected, through equal resistors 112 and 114, to opposite ends of a potentiometer 116. The potentiometer 116 functions to produce at its tap the instantaneous average value of the outputs of the amplifiers 102 and 108. It will be recalled that when the gate 98 passes the pulse train from the gate 70, the amplifier 102 amplifies the pulse train, while the amplifier 110 manifests a constant low level signal. Accordingly, the average value of the outputs of the amplifiers alternates between zero (when the output of the amplifier 102 is high) and a fixed negative voltage (when the outputs of both amplifiers are low). Conversely, when the gate 96 passes the pulses, the output of the amplifier 108 manifests the pulses in inverted form, while the output of the amplifier 102 maintains a constant high level output, so that the average value alternates between zero (when the output of the amplifier 108 is low) and a constant high level (when the outputs of both amplifiers are high). The tap of the potentiometer is adjusted to give a voltage level of zero at the tape when required. Thus, the voltage at the tap is a train of negative pulses or a train of positive pulses of equal amplitude, depending on the condition of the flip-flop 100. The length of each pulse in the train, however, varies directly in proportion to the difference in phase between the signals on lines 68 and 90.

The tap of the potentiometer 116 is connected to an amplifier 118 to produce the error signal on the output line 22. The amplifier 118 is provided with a feedback network incorporating a capacitor 120 and a resistor 122, which network causes the amplifier to function as a low pass filter, smoothing the voltage applied to the output line 22. The level of the voltage applied to the line 22 is, therefore, dependent solely on the length of the pulses passed by the exclusive-OR gate 70, and the signal of the voltage on the line 22 is dependent on the state of the flip-flop 100. The line 22 manifests a d.c. voltage proportional to the magnitude of the difference in phase between the signals present on the lines 68 and 90, which is in turn proportional to the cumulative difference between the number of command pulses applied to the counter 44 and the number of pulses generated by the wave shaping unit 82 in response to the resolver 18.

Input command pulses from an NC device are applied to a terminal 124, which is connected to one input of NAND gate 126. The second input of the NAND gate 126 is normally high so that the command pulses are passed, in inverted form, over a line 128 to one input of the NAND gate 130. The second input of the NAND gate 130 is normally high so that pulses are normally reinverted and conveyed over the line 132 to the D input of a flip-flop 134. The clock input of the flip-flop 134 is connected to the terminal 40 over a line 136, so that the flip-flop 134 is set to its set state, at the negative transition of the clock pulse, whenever a command pulse is then present at the D input. The duration and timing of the commmand pulses is sufficient to insure coincidence with at least one negative transition of a clock pulse, causing the flip-flop 134 to change its state once for each command pulse. The spacing between successive command pulses is such that the trailing edge of the succeeding clock pulse resets the flip-flop 134 following the end of each command pulse. An output of the flip-flop 134 is connected to the input line 52 of the counter 44, so that the counter 44 receives one command pulse for each input command pulse applied to the terminal 124, so long as the second inputs of the gates 126 and 130 remain high, as they normally do.

When it is desired to initialize the system, however, by establishing a zero phase difference between the signals on line 68 and 90 for any starting position of the resolver 28, a high potential is applied to the terminals 135, which is connected to the second input of the gate 126 via an inverter 137. Accordingly, the second input of the gate 126 goes down, inhibiting the gate 126 from transmitting the input command pulses from the terminal 124.

The terminal 135 is also connected to an input of NAND gate 138, the output of which is connected to the second input of the gate 130. As the other input to the gate 130 is connected from the gate 126, which provides a constant high level output when the terminal 135 is high, the gate 130 is enabled to pass pulses from a line 42 through the gates 138 and 130, to the D input of the flip-flop 134, as long as a third input to the gate 138 is high. This occurs as long as a third input to the gate 138, on a line 141 connected from the output of a gate 140 remains high. As will now be described, the level on the line 141 remains high until a condition of zero phase difference between the signals on the lines 68 and 90 is reached. At that time, the output of the gate 140 goes low, inhibiting further operation of the gate 138.

The gate 140 has three inputs, two of which are connected to the two outputs of a pair of flip-flops 142 and 144. The flip-flops 142 and 144 have their clock pulse inputs connected to mutually exclusive outputs of a one shot multivibrator 146. The D inputs of the flip-flop 142 is connected directly to the line 90, and the D input of the flip-flop 144 is connected to the line 90 through an inverter 148. In operation, the one shot multivibrator 146 produces a short pulse during its quasi-stable period, which begins at the negative transition of the square wave present on the line 68. Mutually exclusive outputs of the multivibrator 146 actuate the clocks of the flip-flops 142 and 144 so that one of the two flip-flops 142 and 144 is triggered at the start of the quasi-stable period of the one shot 146, and the other flip flop is triggered at the end of the period.

As the line 90 is connected directly to the D input of the flip-flop 142, and through an inverter 148 to the D input of a flip-flop 144, the flip-flop 142 is set to its "one" state if the signal on the line 90 is high at the beginning of the pulse from the multivibrator 146, and is reset to its "zero" state if the signal on the line 90 is low at that time. Conversely, the flip-flop 144 is set to its "one" state if the signal on the line 90 is low at the end of that pulse, and reset to its "zero" state if the signal on the line 90 is then high. Therefore, the only way in which both flip-flops 142 and 144 can both be set to their one states is when the signal on the line 90 falls from a high level to a low level during the quasi-stable period of the one shot multivibrator 146. This occurs only when the signals in the line 68 and 90 are approximately in phase, differing in phase by no more than the duration of the quasi-stable period. Accordingly, the state of the counter 44 is advanced, shifting the phase of the signal in the line 90, until a zero phase difference condition is reached which sets both of the flip-flops 142 and 144 to their one states, with the result that the outputs of these flip-flops which are connected to the gate 140 both go high, and the output of the gate 140 then goes low, disabling the gate 138, after which the counter 44 maintains the same state, as long as a high level is applied to the terminals 135 and 139.

The initializing operation described above is carried out while the servo loop is de-energized, as by, for example, disconnecting the line 22 from the amplifier 24. Therefore, the resolver 18 remains stationary while the counter 44 is being advanced to the zero phase difference condition.

The gate 138 may also be used to pass the pulses from line 42 to the counter 44 while the servo system is energized in order to generate an error signal which causes the motor to drive the controlled member of the servo system. This operation is accomplished by placing a high level on the terminal 135 while the servo system is operating. If the level at the terminal 139 remains low during this time, the gate 140 is inhibited and does not prevent the advancement of the counter 44 beyond the zero phase condition, and the servo motor is driven at a speed proportional to the frequency of the pulses on the line 42 as long as the high level remains on the terminal 124. The direction of the drive is controlled as in normal operation, by the voltage level present at the terminal 62. This mode of operation is conveniently employed to manually control the drive motion when desired. A terminal 150 is inverted to a reset terminal of each of the units 46, 48 and 50 of the counter 44, to permit the counter 44 to be reset to zero when a signal is applied to the terminal 150. An arrow signal is then developed on the line 22 which causes the servo system to move to a fixed "home" position.

It will be appreciated from the foregoing description that the present invention accomplishes the function of permitting control of the servo system over a wide range of following errors without loss of synchronization, and without any loss of accuracy.

In one preferred embodiment of the present invention, the counters 33 and 44 are composed of decade units manufactured by Signetics, Model No. N8285A; the comparator units are Texas Instruments, Ser. No. 74L85N, the two input gates are all Texas Instruments, Ser. No. 7,400N; the three input gate is Texas Instruments, Ser. No. 7,410N; the exclusive-OR gates are Texas Instruments, Ser. No. 7,486N; the counters 66 and 88 are Signetics, Model No. N8284A; the flip-flops are all Texas Instruments, Ser. No. 7,474N; the one shot multivibrators are all Texas Instruments, Ser. No. 7,4123N; and the amplifiers 102 and 108 are Signetics, Model No. N8T15A.

What is claimed is:

I claim:

1. In a servo system having a motor for driving a controlled member in response to an error signal, and a resolver connected with said controlled member for producing a signal responsive to the movement thereof, the combination comprising; a first counter connected to a source of clock pulses for counting said clock pulses, a second counter connected to a source of command pulses for counting said command pulses, a comparator connected with said first and second counters for producing a signal having a frequency proportional to the difference in the frequency between said clock pulses and said command pulses, means for comparing the phase of said comparator-produced signal with said revolver-produced signal for producing said error signal in response to the difference in phase therebetween.

2. Apparatus according to claim 1 wherein said phase comparator means comprises gate means connected with said resolver and with said comparator for producing a train of pulses, each of said pulses having a duration proportional to the difference in phase between said resolver-produced signal and said comparator-produced signal, and means for integrating said pulse train to produce an error signal having a level proportional to the duration of each of said pulses.

3. Apparatus according to claim 2 including first and second amplifier units, said first amplifier units being connected directly with said gate means for receiving said pulse train, inverter means, said second amplifier unit being connected to said gate means through said inverter means for receiving said pulse train in inverted form, means connected with said first and second amplifier units for producing an average pulse train having an instantaneous amplitude equal to the average values of the outputs of said amplifier units, and means for selectively maintaining the input of one of said amplifier units at a constant level.

4. Apparatus according to claim 3 wherein said last named means comprises a bistable device having a setting input, a clock input, and two mutually exclusive outputs, said bistable device having its setting input connected with said resolver and its clock input connected with said comparator. An exclusively-OR gate having its two inputs connected individually with said comparator and with said resolver, said gate means comprising first and second control gates each having first input connected in common to the output of said exclusive-OR gate and its other input connected individually to the two mutually exclusive outputs of said bistable device, one of said control gates being connected directly to said first amplifier unit, and inverter means for connecting said control gates to said second amplifier unit.

5. Apparatus according to claim 1 including dividing means connected to said resolver for dividing the frequency of said resolver-produced signal, and dividing means connected to said comparator for dividing the frequency of said comparator-produced signal, both of said dividing means having the same radix.

6. Apparatus according to claim 1 including means connected with said first counter for deriving a two-phase a.c. signal from said clock pulses, said a.c. signal having a frequency equal to an integral submultiple of the frequency of said clock pulses, and means for connecting said two-phase a.c. signal to said resolver.

7. Apparatus according to claim 1 including means for deriving a control pulse train from said first counter, said control pulse train having a frequency equal to a submultiple of the frequency of said clock pulses, connecting means for selective applying said control pulse train to said second counter to advance the state thereof, and means responsive to a predetermined relation between the phase of said comparator-generated signal and said resolver-generated signal for terminating the advancement of said second counter by said control pulse train.

8. Apparatus according to claim 7 including control means connected with said comparator and with said resolver, and responsive thereto for disabling said connecting means in response to initiation of a condition in which the phase of said resolver-produced signal is equal to that of said comparator-produced signal.

9. Apparatus according to claim 8 wherein said control means comprises a monostable multivibrator for producing a short duration pulse during each cycle of said comparator-produced signal, a monostable multivibrator having a pair of mutually exclusive outputs for producing signals indicative of the state of the multivibrator, first and second bistable devices each having a setting input, a clock input, and at least one output for producing a signal indicative of the state of the device, means for connecting one output of said monostable multivibrator with the clock input of said first bistable device, means for connecting the other output of said monostable multivibrator with the clock input of said second bistable device, whereby said first bistable device is enabled to be set at the beginning of the quasi-stable state of said multivibrator and said second bistable device is enabled to be set at the end of said quasi-stable state, and means for connecting said resolver-produced signal directly to the setting input of said first bistable device, inverter means for connecting said resolver-produced signal to the setting input of said second bistable device, gate means connected with the outputs of said first and second bistable devices for producing a coincidence signal when both of said flip-flops are simultaneously in their set state, and means responsive to said gate means for selectively applying said control pulse train to said second counter until said gate means produces said coincidence signal.

10. Apparatus according to claim 8 including means for selectively disabling said control means.

* * * * *